United States Patent [19]
Hostetler

[11] 3,946,701
[45] Mar. 30, 1976

[54] TROUGH FEEDER WITH SHIELD FOR GROWING FOWL

[75] Inventor: Eldon Hostetler, Middlebury, Ind.

[73] Assignee: Chore-Time Equipment, Inc., Milford, Ind.

[22] Filed: Jan. 14, 1974

[21] Appl. No.: 433,364

[52] U.S. Cl. .................................. 119/18; 119/61
[51] Int. Cl.² ................................ A01K 31/00
[58] Field of Search .................................. 119/18

[56] References Cited
UNITED STATES PATENTS

| | | | |
|---|---|---|---|
| 2,840,040 | 6/1958 | Turner | 119/61 |
| 3,593,689 | 7/1971 | Van Huis | 119/18 |

*Primary Examiner*—Louis G. Mancene
*Assistant Examiner*—Peter K. Skiff
*Attorney, Agent, or Firm*—Olson, Trexler, Wolters, Bushnell & Fosse, Ltd.

[57] ABSTRACT

A trough feeder is disclosed for use with growing fowl. The feeder is partially defined by a relatively low feed-retaining side wall located adjacent a row of retaining cages. Spaced above the cages at a first mounting position is a shield member. Small chicks are induced to reach for feed in the trough from a low position above the trough side wall and below the shield. When the fowl grow larger, the shield is lowered into a second mounting position adjacent the trough side wall. When so positioned, the adult chickens are forced to obtain feed from a higher position by reaching over the top of the shield member, and are inhibited from raking or tossing feed out of the trough feeder.

2 Claims, 3 Drawing Figures

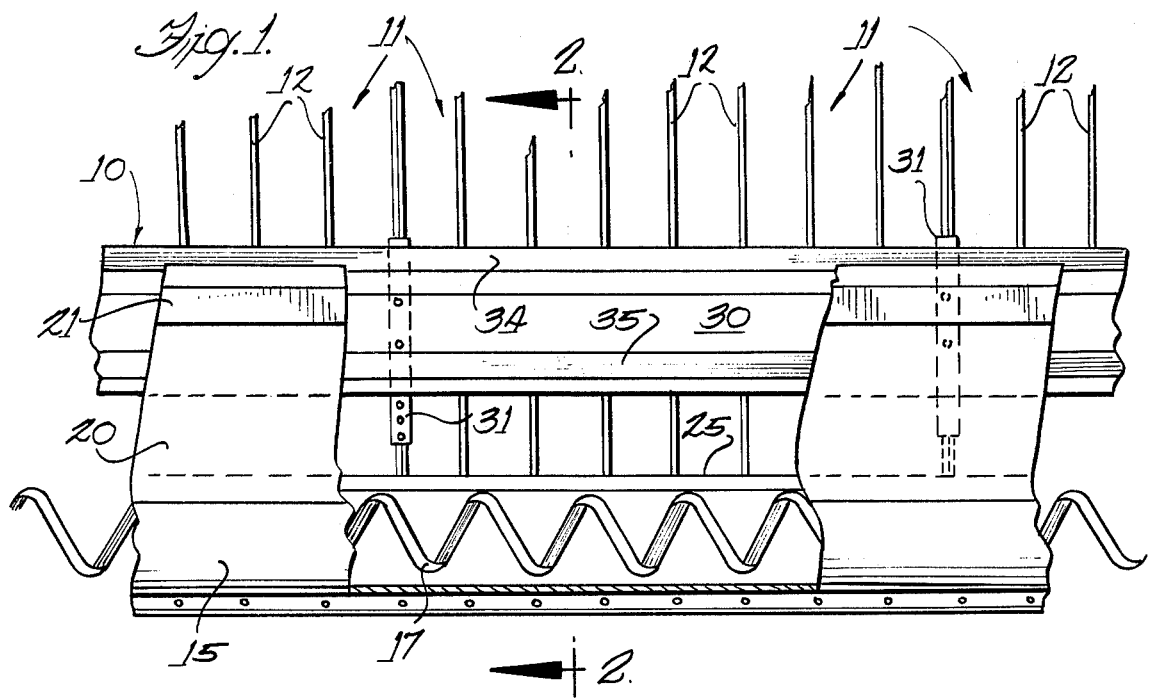
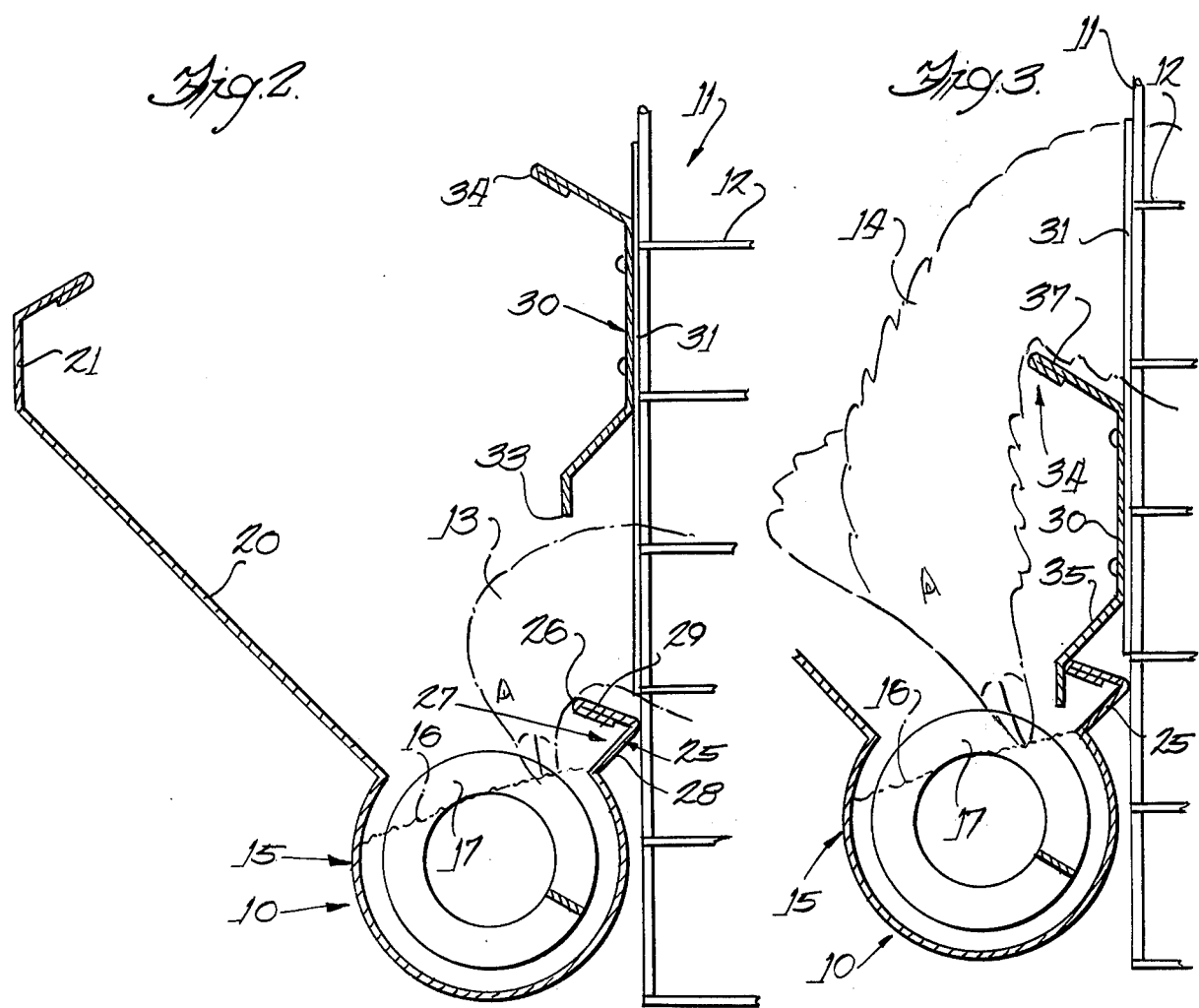

TROUGH FEEDER WITH SHIELD FOR GROWING FOWL

BACKGROUND OF THE INVENTION

In modern poultry husbandry operations, the concept of maintaining chickens or other birds in cages arrayed in rows inside poultry houses is becoming increasingly popular. In many cage houses, the cages are arrayed in rows along the length of the house, and each cage contains a number of laying hens. Several rows of cages are mounted in relative stepped-back ascending sets to maximize the number of cages and fowl to be accommodated. Service aisles are provided between cage rows.

Highly automated feeding systems are now offered to feed the fowl so caged and housed. In one successful feeding system, feed is received from a remote source and is deposited along a trough feeder conveyor mounted adjacent the sides of a row of cages. The feeder trough is mounted so as to permit the chickens to obtain feed by reaching through the cage bars and into the trough.

Until now, such feeders could not be used effectively with small or immature chicks. If the trough were mounted at an elevation any considerable distance above the cage bottom, the small chicks could not reach the feed. Alternatively, if the feeder trough were mounted at or near the cage bottom, the immature chicks could reach the feed with ease, but as the chicks grew larger and matured, the birds became able to rake or toss feed out of the trough feeder, thereby wasting feed and necessitating laborious clean-up operation. Repositioning the trough feeder at successively higher levels as the birds grew up proved impractical, since this action necessitated corresponding adjustments to other parts of the feeding system.

For this reason, it has been common practice to mount the feeder trough at an elevation sufficient to discourage or inhibit mature birds from raking or tossing feed out of the feeder. When small chicks or immature birds are introduced into the cages, they have been fed by laying paper or other flooring within the cages, and then providing quantities of loose feed upon the cage floors for the birds to consume.

Feeding the small birds in this manner is not entirely satisfactory. This procedure requires the use of a costly feeding cart traveling along the service aisles or some other feed dispenser. Feed is inevitably wasted as the small birds inadvertently kick the feed surrounding their feet out of the cage. Moreover, the feed on the cage floor is inevitably spoiled by the natural elimination of the caged birds. Further, during the period when the fowl are relatively immature, the trough feeder remains unused and is idle.

It is therefore the general object of the present invention to provide a trough feeder mechanism which can be used to feed caged fowl of any age. More specifically, it is an object to provide a trough feeder which can be used to feed adult birds as well as chicks even one or two days old.

Another object of the invention is to provide a trough feeder for use with both adult birds and immature chicks which inhibits the using birds from raking or tossing feed out of the conveyor.

Still another object of the invention is to provide a trough feeder for use with baby chicks which prevents the chicks from spoiling the feed with natural elimination or otherwise wasting it.

Yet another object of the invention is to provide a feeder which will eliminate the necessity of placing feed upon paper or other flooring material within a cage. It is an associated object to eliminate the machinery, labor, and mess attendant upon such a procedure.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a fragmentary elevational view of a trough feeder embodying the present invention as it appears when installed adjacent a series of typical poultry cages;

FIG. 2 is a sectional view taken substantially in the plane of line 2—2 in FIG. 1 and showing the novel trough poultry feeder of the present invention as it appears when installed adjacent a typical poultry cage containing a relatively small bird or chick; and FIG. 3 is a sectional view similar to FIG. 2 but showing the novel trough feeder as it appears when installed adjacent a typical cage containing a relatively large or adult bird.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Turning to the drawings, there is shown a trough feeder 10 mounted, as by means not shown, adjacent a row of cages 11 which are defined by cage bars 12. These cages 11 are designed to contain several relatively small birds or chicks 13, or relatively large or adult birds 14. As illustrated, the trough feeder 10 includes a bottom carrier member 15 adapted to contain a quantity of feed 16, and a device — here, a centerless auger 17 — for urging the feed 16 along the length of the conveyor 10. A feed-retaining angled side 20 is provided on the feeder side opposite the cages 11, and this side 20 extends upwardly a relatively great distance sufficient to discourage either the immature or small birds 13 or the mature or large birds 14 from raking or tossing feed over the retention side 20. At the top of the side 20, a baffle or guard 21 can be provided to further inhibit the loss of feed from the conveyor.

In accordance with one aspect of the invention, the feeder trough 10 is further defined by a second wall member 25 adjacent the cages 11 and extending upward a relatively short pre-determined distance from the trough bottom carrier 15. This wall extension 25 is of a height sufficient to permit the relatively small chickens 13 to reach over the top 26 of the wall 25 to obtain feed 17. However, the height of the wall 25 is sufficient to discourage the small chickens 13 from raking or tossing the feed over the trough side 25.

In carrying out the invention, the illustrated wall 25 is provided with anti-rake means for inhibiting the small chickens 13 from raking or tossing feed over its top 26. Here, the anti-rake means comprises a baffle formation 27 including an outward and upward extension 28 oriented away from the feed 16 contained in the trough, and an inward and upward projection 29 located generally over the extension 28 as illustrated in FIG. 2.

In accordance with yet another aspect of the invention, large chickens 14 are discouraged or inhibited from raking or tossing feed out of the feeder 10 by a shield member 30. However, by convenient mounting devices 31, this shield member 30 can be mounted at a first position spaced above the trough wall 25 to permit or induce the small chickens 13 to reach under the shield 30 and over the wall 25 from the relatively low position illustrated in FIG. 2 to obtain the feed 16 carried within the trough conveyor 10. In the illustrated embodiment, the mounting devices 31 take the form of strips secured to the cage bars 12. The shield 30 is slidably carried upon the strips 31 adjacent the cages 11 and above the trough wall member 25.

When the growing chickens begin to reach maturity, the shield 30 is lowered into a second position as shown in FIG. 3. In this second position, the relatively adult chickens 14 are forced to reach over the top 34 of the shield 30 to obtain access to the supply of feed 16 from a relatively high position above both the trough side member 25 and the shield top 34. Since the pre-determined height of the shield 30 is sufficient to discourage the large chickens 14 from raking or tossing feed over the trough shield, feed retention is encouraged and wastage is minimized.

In this second position, the lower portion 35 of the shield 30 engages the trough wall 25 and inhibits the passage of feed 16 between the shield 30 and the trough wall 25 when shield member is mounted in the illustrated second or lower position. The top 34 of the shield 30 includes an upward and outwardly extending baffle portion 37 which acts as a positive anti-rake device to inhibit the large chickens 14 from raking or tossing feed about.

Management of the shield in the manner indicated is easy and can be quickly accomplished by even inexperienced or unskilled labor. The shield 30 is originally located in its first or relatively raised position as shown in FIG. 2. Baby chicks 13 are placed in the cages 11 in the usual manner, and feed 16 is automatically or otherwise introduced into the adjacent trough 10. The chicks soon learn to obtain feed from the trough, from the illustrated position above the trough wall 25, and below the bottom 33 of the shield 30.

After a short time, the chicks reach a sufficient size, and the shield is lowered into the second position indicated in FIG. 3. Thereafter, the larger chickens 14 are induced to reach the feed 16 in the trough 10 from a position above both the trough side 25 and above the trough shield top 34. After the mature chickens 14 are removed from the cages 11 and before the next flock of chicks 13 are introduced, the shield 30 is returned to its first or upper position.

The invention is claimed as follows:

1. For use with a trough feeder for chickens and like animals retained in cages, said trough feeder having a trough for carrying feed and defined by at least one member located adjacent the cages, a trough feeder shield, the shield having at its top a diagonally outwardly and upwardly extending anti-rake baffle portion and shield mounting means, the mounting means including sliding strip members mounted to the cages adjacent the trough and carrying the shield at a first position adjacent the cages and spaced above the trough side member to permit small chickens to reach the feed carried in the trough from a relatively low position above the trough side member and below the shield bottom, and at a second position adjacent the cages and lowered into engagement with the trough side member to force large chickens to reach the feed carried in the trough from a relatively high position above the trough side member and above the shield top baffle portion, the sliding strip members permitting the shield to be non-rotatably slid vertically along the cage between said first and said second positions, whereby to inhibit said large chickens from raking or tossing feed out of the trough feeder.

2. A trough feeder for chickens and the like retained in barred cages, comprising, in combination, a trough member located adjacent the cages and adapted to receive and retain a supply of feed, the trough member having at least one side wall member adjacent the cages and extending upward a short pre-determined distance, said distance being sufficient to permit relatively small chickens to reach over the top of said side wall to obtain feed yet discourage the small chickens from raking or tossing feed over the trough side, a shield member of pre-determined height slidable between a first position spaced above said trough side permitting the small chickens to reach under said shield to obtain feed, and a second position forcing large chickens to reach over the shield to obtain feed, the shield including anti-rake baffle means at the shield top and extending diagonally outwardly and upwardly from the cages to discourage the large chickens from raking or tossing feed over the trough, the shield, and the shield baffle top, and sliding shield mounting means including strips secured to the cage bars and adapted to retain the shield adjacent the cage in either the first or the second position, whereby to guide the shield during its sliding motion between said first and second positions.

* * * * *